US005081839A

United States Patent [19]

McWilliams

[11] Patent Number: 5,081,839

[45] Date of Patent: Jan. 21, 1992

[54] PRESSURE COMPENSATED HYDRAULIC SYSTEM

[75] Inventor: O. Dean McWilliams, Morris, Ill.

[73] Assignee: Caterpillar Inc., Peoria, Ill.

[21] Appl. No.: 471,565

[22] Filed: Jan. 29, 1990

[51] Int. Cl.[5] ........................ F16D 31/02

[52] U.S. Cl. ........................ 60/468; 60/427; 417/307

[58] Field of Search ........................ 60/427, 468; 417/307, 417/310

[56] References Cited

U.S. PATENT DOCUMENTS

| | | | |
|---|---|---|---|
| 2,214,817 | 9/1940 | Harrington | 417/307 X |
| 2,892,312 | 6/1959 | Allen et al. | 60/468 X |
| 3,411,295 | 11/1968 | Byers, Jr. | 60/52 |
| 3,878,864 | 4/1975 | Schurger | 137/596.13 |
| 3,937,129 | 2/1976 | Miller | 91/412 |
| 3,948,146 | 4/1976 | Maurer et al. | 60/468 X |
| 3,971,216 | 7/1976 | Miller | 60/445 |
| 4,727,793 | 3/1988 | Hall | 91/451 |
| 4,879,945 | 11/1989 | Brunner et al. | 60/468 X |
| 4,941,321 | 7/1990 | Brunner | 60/468 |
| 4,977,928 | 12/1990 | Smith et al. | 60/422 X |

FOREIGN PATENT DOCUMENTS

| | | |
|---|---|---|
| 2620041 | 11/1977 | Fed. Rep. of Germany . |
| 3425304 | 1/1986 | Fed. Rep. of Germany . |
| 2216466 | 8/1974 | France . |

*Primary Examiner*—Edward K. Look
*Assistant Examiner*—Todd Mattingly
*Attorney, Agent, or Firm*—John W. Grant

[57] ABSTRACT

Pressure compensated hydraulic systems are useful in reducing the expenditure of energy when the system is in operation but not being used. Optimizing the operating characteristics for certain applications increases the response time due to no load pressure or cavitation in the hydraulic jack being actuated. The pressure compensated hydraulic system includes a restriction disposed in a pilot passage which normally subjects pump discharge pressure to one end of an unloading valve. A control passage is connected to the pilot passage between the restriction and the end of the unloading valve and in one mode of operation communicates pressurized fluid through the system and eventually back to the spring end of the unloading valve to move it to a fluid blocking position. In another mode of operation, the control passagae lowers the fluid pressure at the end of the unloading valve allowing a spring to move the unloading valve to the blocking position in the abovementioned modes of operation, the system response time is greatly improved.

11 Claims, 1 Drawing Sheet

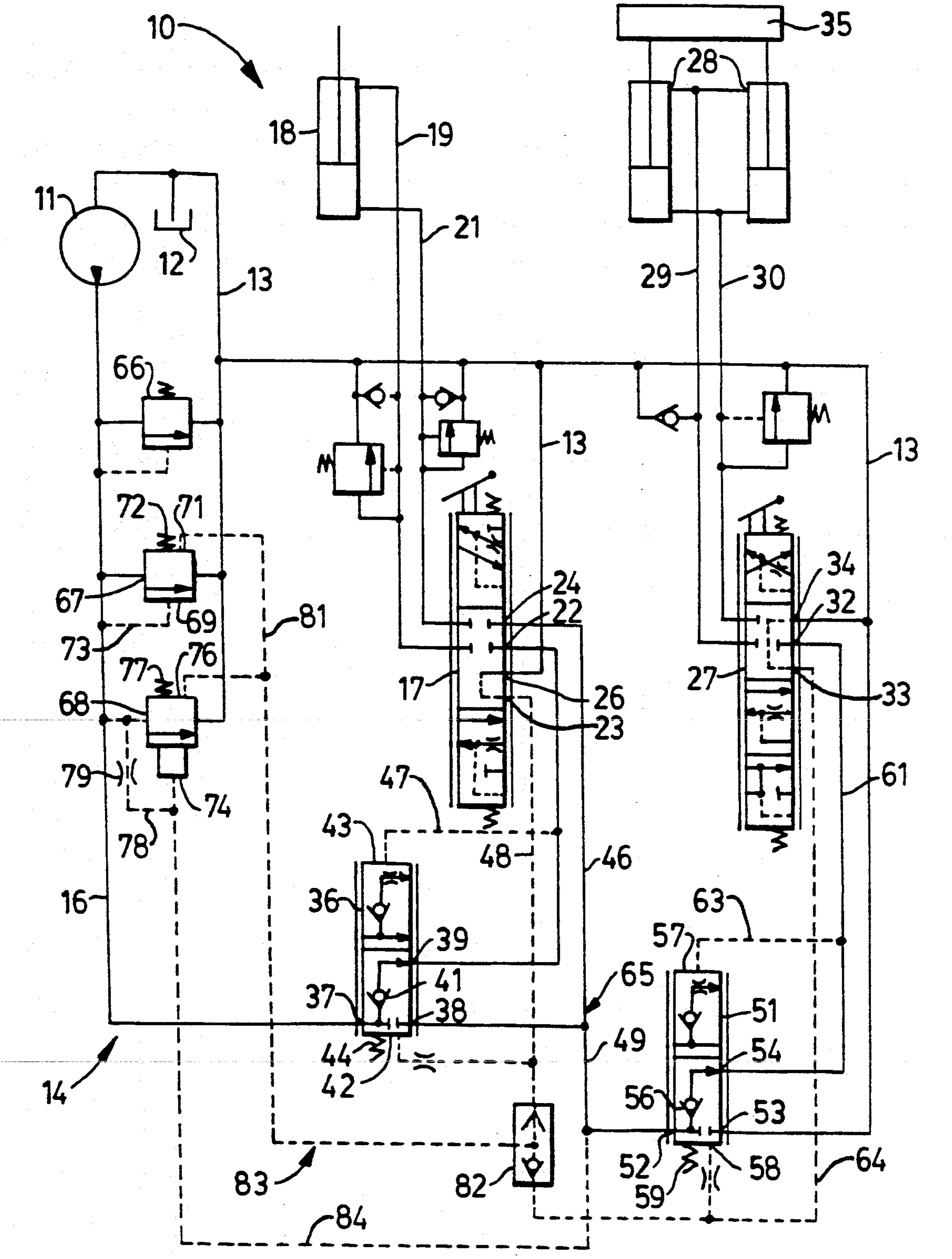
10
18
19
35
28
11
12
13
21
29
30
66
13
13
72
71
67
69
81
24
22
34
32
73
77
76
17
26
27
33
68
23
79
74
47
61
78
43
48
46
16
36
39
63
57
37
41
65
38
51
44
49
54
42
14
56
53
83
82
52
58
64
59
84

PRESSURE COMPENSATED HYDRAULIC SYSTEM

DESCRIPTION

1. Technical Field

This invention relates generally to a hydraulic system and more particularly to a pressure compensated hydraulic system having improved operation of an unloading valve.

2. Background Art

Some pressure compensated hydraulic systems use an unloading valve to vent the discharge fluid from a fixed displacement pump to a tank at low pressure under certain operating conditions. Such unloading valve is normally biased to a blocking position by a lightweight spring positioned at one end thereof. In use the unloading valve is urged to a venting position by the pressure of the pump discharge fluid acting on the end of the unloading valve against the force of the spring when the directional control valves are in a neutral position and no load pressure signal is present in a load pressure signal network. In order to reduce the expenditure of energy when none of the control valves are being used the spring of the unloading valve is commonly selected so that discharge of the pump is vented at about 450 kPa. When one or more of the directional control valves are moved to an operating position, a positive load pressure signal is normally directed through the signal network to the spring end of the unloading valve where it works in concert with the spring to urge the unloading valve to the blocking position so that the pressure of the discharge fluid is increased to a working level.

The above-described pressure compensated hydraulic system also commonly has a pressure compensated flow control valve associated with each of the directional control valves with the function thereof being to establish a predetermined pressure differential across the directional control valve when it is in an operating position. To satisfy certain operating characteristics, some of the flow control valves are connected in series with an upstream one having priority over a downstream one. One of the problems encountered with such system is caused by the priority aspect of the flow control valves wherein one of the flow control valves blocks the pump discharge fluid from one of the directional control valves when the upstream directional control valves are in a neutral position. If no positive load pressure is generated in the jack associated with the downstream directional control valve when it is actuated, the unloading valve remains in the venting position and there would be insufficient fluid pressure to move the upstream flow control valve to a position for passing fluid from the pump to the downstream directional control valve.

Another problem encountered with such a system is that of slow response of the hydraulic system when a directional control valve connected to a hydraulic jack supporting a load is shifted to a position to lower the load. Under such condition the load tends to be lowered under the influence of gravity such that no positive load signal is generated in the system. Without a positive load signal the unloading valve remains in the venting position and the output of the pump is vented to the tank. If the load is lowered quickly, the fluid is forced out of the load supporting end of the hydraulic jack faster than the system can fill the other end resulting in the unloaded end being cavitated. The pressure compensated flow control valves tend to maintain the system pressure at the level dictated by the spring of the unloading valve such that the unloading valve remains in the venting position and very little fluid is available to fill the cavitated end of the hydraulic jack. This causes an undesirable delay or lag time when the directional control valve is maintained in a position for applying a downward force by the hydraulic jack.

U.S. Pat. No. 4,727,793 which issued to Lowell R. Hall on Mar. 1, 1988, shows one solution to the above-noted problems, wherein an artificial signal is transmitted to the spring end of the unloading valve under certain operating conditions. The arrangement disclosed in that patent requires an additional pressure responsive valve to transmit the artificial load signal. Such additional valve would require additional space in an already crowded area and is not readily adaptable to existing hydraulic systems.

The present invention is directed to overcoming the problem as set forth above.

DISCLOSURE OF THE INVENTION

In one aspect of the invention, a pressure compensated hydraulic control system includes a pump, supply conduit means connected to the pump, an unloading valve connected to the supply conduit means and being movable between open and closed positions with the valve having first and second ends, a spring biasing the valve to a closed position, a directional control valve having an inlet port, means for connecting the supply conduit means to the inlet of the directional control valve, a pilot passage connecting the supply conduit means with the second end of the unloading valve, a restriction disposed in the pilot passage, and a control passage connecting the connecting means with the pilot passage between the restriction and the second end of the unloading valve.

The present invention provides a pressure compensated hydraulic control system which improves the response time when the system is used for raising or lowering a bucket of a loader or other similar implement when no positive load generated pressure is present or when cavitation occurs in a particular part of the system. In situations where no load generated pressure is present in the jack being actuated, pressurized fluid from the supply conduit is communicated through a pilot passage and a control passage to an inlet port of a directional control valve connected to the jack. The fluid pressure in the jack increases immediately due to the load acting on the jack and is communicated to the spring end of the unloading valve in the usual manner to move it to the closed position. This causes an immediate increase in the system pressure such that the system then operates in the usual manner. In situations wherein the jack cavitates, the control passage subjects the other end of the unloading valve to low pressure allowing the spring to move the unloading valve to the closed position. Blocking fluid flow through the unloading valve makes essentially the full pump flow available for filling the cavitated end of the jack.

BRIEF DESCRIPTION OF THE DRAWING

The sole FIGURE is a schematic circuit of an embodiment of the present invention.

BEST MODE FOR CARRYING OUT THE INVENTION

With reference to the drawing, a pressure compensated hydraulic system 10 includes a fixed displacement pump 11 connected to a tank 12 through a fluid return conduit 13. A fluid supply conduit means 14 is connected to the pump 11 and includes a main supply conduit 16. A directional control valve 17 is connected to opposite ends of a hydraulic jack 18 through a pair of motor conduits 19 and 21 in the usual manner. The control valve 17 has an inlet port 22, a load pressure signal port 23, and a pair of outlet ports 24 and 26, with the outlet port 26 being connected to the return conduit 13. Similarly, another directional control valve 27 is connected to opposite ends of a pair of load supporting jacks 28 through a pair of motor conduits 29 and 30. The control valve 27 includes an inlet port 32, a load pressure signal port 33, and an outlet port 34 with the outlet port being connected to the return conduit 13.

For illustrative convenience, the hydraulic jacks 28 are illustrated as being adapted to raise or lower a load 35. One example of such load would be for the hydraulic jacks 28 being connected to the lift arms of a loader in which case the hydraulic jack 18 would be actuatable for controlling a bucket mounted on the distal ends of the lift arms. Moreover, while the directional control valves are illustrated as manually controlled valves, they can also be pilot controlled valves.

A pressure compensated flow control valve 36 has an inlet port 37, a pair of outlet ports 38,39, a load check valve 41 disposed between the inlet port 37 and the outlet port 39, opposite ends 42,43 and a spring 44 positioned at the end 42. The supply conduit 16 is connected to the inlet port 37. A service passage 46 connects the outlet port 39 to the inlet port 22 of the directional control valve 17. A pilot passage 47 connects the service passage 46 to the end 43 of the flow control valve 36. A signal passage 48 connects the signal port 23 of the control valve 17 to the end 42 of the flow control valve 36. A supplemental supply conduit 49 is connected to the outlet port 38 of the flow control valve 36 and to the outlet port 24 of the directional control valve 17.

A dump valve 51 has an inlet port 52, a pair of outlet ports 53,54, a load check valve 56 disposed between the inlet port 52 and the outlet port 54, opposite ends 57,58, and a spring 59 positioned at the end 58. The supplemental supply conduit 49 is connected to the inlet port 52. The outlet port 53 is connected to the return conduit 13. A service passage 61 is connected to the outlet port 54 and to the inlet port 32 of the directional control valve 27. A pilot passage 63 connects the service passage to the end 57 of the dump valve 51. A signal passage 64 connects the signal port 33 with the end 58 of the dump valve 51. The control valve 36, the supplemental supply conduit 49, the dump valve 51 and the service passage 61 make up a means 65 for connecting the supply conduit means 14 to the inlet port 32 of the directional control valve 27.

A main relief valve 66, a margin valve 67, and a pump unloading valve 68 are connected in parallel relationship between the supply conduit 16 and the return conduit 13. The margin valve 67 has opposite ends 69,71 and a spring 72 disposed at the end 71 biasing the margin valve to a closed or fluid blocking position. A pilot passage 73 connects the supply conduit 16 to the end 69. Similarly, the unloading valve 68 has opposite ends 74,76 and a light weight spring 77 disposed at the end 76 and biasing the unloading valve to the closed or fluid blocking position. A pilot passage 78 connects the supply conduit 16 with the end 74. A restriction in the form of a fixed sized orifice 79 is disposed in the pilot passage 78. A signal line 81 connects the end 71 of the margin valve 67 and the end 76 of the unloading valve 68 to a resolver 82, which in turn is connected to the signal passages 48 and 64. The signal line 81, the resolver 82, and the signal passages 48 and 64 make up a signal network 83. A control passage 84 is connected to the pilot passage 78 between the orifice 79 and the end 74 and to the supplemental supply conduit 49 of the connecting means 65.

INDUSTRIAL APPLICABILITY

In the use of the pressure compensated hydraulic system 10 when both of the directional control valves 17 and 27 are in the neutral position shown, there is no load signal in the signal network 83. Thus, pump discharge pressure from the supply conduit 16 passes through the pilot passage 78 and orifice 79 and acts on the end 74 of the unloading valve to move the valve against the light weight spring 77 to the open position, thereby communicating the supply conduit 16 with the return conduit 13. This unloads the pump at a pressure dictated by the force of the spring 77 which in this embodiment is approximately 450 kPa. In contrast thereto, the spring 72 of the margin valve is selected so that the margin valve remains closed at such pressure. Also the spring 44 will maintain the pressure compensated control valve 36 in the position shown at which the inlet port 37 is blocked from the outlet port 38.

To extend the hydraulic jack 18, the directional control valve 17 is moved downwardly to an operating position at which the service passage 46 is in communication with the motor conduit 21, and the motor conduit 19 is in communication with the return passage 13. The signal port 23 communicates the pressure in the motor conduit 21 with the signal line 48 through the resolver 82 and signal line 81 to the end 76 of the unloading valve 68 and the end 71 of the margin valve 67. The combined force of the spring 77 and the force generated on the end 76 moves the unloading valve to the closed position blocking the flow of fluid therethrough. The fluid pressure and flow in the supply conduit 16 and service passage 46 thus increase to meet the demand called for by the directional control valve. The margin valve 67 functions in the conventional manner to maintain a first predetermined pressure differential between the pressure in the supply conduit 16 and the pressure in the signal network 83 which in this case is the pressure required to move the hydraulic jack 18. The pressure compensated flow control valve 36 functions in the conventional manner to maintain a second predetermined pressure differential between the fluid pressure in the service passage 46 and the signal line 48. In this embodiment, the first predetermined pressure differential is approximately 1500 kPa and the second predetermined pressure differential is approximately 830 kPa.

Retracting the hydraulic jack 18 is initiated by moving the directional control valve 17 upwardly to connect the service passage 46 with the motor conduit 19 and the motor conduit 21 with the supplemental supply conduit 49. At this position of the directional control valve, the unloading valve 68, the margin valve 67, and flow control valve 36 work as previously described. However, the fluid exhausted from the hydraulic jack through the motor conduit 21 passes through the supplemental supply conduit 49 and the dump valve 51 and into the service passage 61. With the control valve 27 in the neutral position shown, fluid pressure builds up in the service passage 61 and is transmitted through the pilot passage 63 to urge the dump valve downwardly to communicate the supplementary supply conduit 49 with the return conduit 13.

Extension of the hydraulic jacks 28 is initiated by moving the directional control valve 27 downwardly to connect the motor conduit 30 and the signal passage 64 to the service passage 61 and to connect the motor conduit 29 with the return conduit 13. If the jacks are supporting a load the load generated pressure is directed through the signal passage 64 and hence the signal network 83 to the unloading valve 68, the margin valve 67, and the dump valve 51. This causes the unloading valve to move to the blocking position. With the control valve 17 in the neutral position shown, the flow control valve 36 will also be in the position shown thereby momentarily blocking the supply conduit 16 from the supplemental supply conduit. With flow through the supply conduit blocked, the fluid pressure therein and hence the service passage 46 and pilot passage 47 rapidly increases to a level sufficient to move the flow control valve 36 downward against the force of the spring 44 to a position at which fluid from the supply conduit is directed into the supplemental supply conduit. The fluid in the supplemental supply conduit passes through the dump valve 51, the service passage 61, the directional control valve 27, the motor conduit 30, and into the head end of the hydraulic jacks 28 causing them to extend. The fluid pressure in the service passage 61 is communicated through the pilot passage 63 to the end 57 of the dump valve 51 which now acts as a pressure compensated valve to maintain a third predetermined pressure differential between the service passage 61 and the motor conduit 30.

Sometimes, the load 35 normally supported by the jacks 28 may be supported by something else such that no load generated pressure is present in either of the motor conduits 29 or 30. If the control valve 27 is moved to the downward position to extend the jacks 28 under that condition, the flow control valve 36 momentarily blocks fluid flow to the supplemental supply conduit 49 as previously described. However, pressurized fluid from the supply conduit 16 passes through the pilot passage 78, the control passage 84, the dump valve 51, the service passage 61, the control valve and into the motor conduit 30. The pressure in the motor conduit 30 immediately increases due the load thereby causing a load pressure signal to be communicated through the signal network 83 to move the unloading valve 68 to the blocking position. The resulting pressure increase in the supply conduit will cause the control valve 36 to move downwardly to communicate the supply conduit with the service passage 61 as previously described. The fluid communicated to the supplemental supply conduit passes through the dump valve 51 and to the control valve 27 to meet the demand for extending the jacks.

Retraction of the hydraulic jacks 28 is initiated by moving the directional control valve 27 upwardly to connect the motor conduit 29 with the supply passage 61 and the signal passage 64 and the motor conduit 30 with the return conduit 13. If the hydraulic jacks 28 are supporting a load, the load will tend to retract the jacks and force the fluid from the head ends of the hydraulic jacks due to gravity and cause the motor conduits 29 and service passage 61 to cavitate. The fluid in the control passage 84 will feed into the service passage 61 and the fluid pressure in the control passage 84 and the pressure in the end 74 of the unloading valve will drop to a level permitting the spring 77 to move the unloading valve to the closed position. The orifice 79 is sized to generate a pressure differential in the fluid passing through the pilot passage 78 thereby preventing a build-up of pressure at the end 74 so long as the supply passage 61 is cavitated and the control passage is feeding fluid thereto. With the unloading valve in the closed position, the pressure in the supply conduit 16 is raised to a level sufficient to move the flow control valve 36 downward to pass fluid therethrough and into the supplemental supply conduit 49. From there, the fluid passes through the dump valve 51, the service passage 61, the directional control valve 27, and the motor conduit 29, to thereby fill the rod end of the hydraulic jacks. Thus, if the load happens to be an implement being lowered to the ground, the hydraulic jacks 28 would be filled with fluid when the implement reaches the ground so that positive down pressure can be very quickly generated in the system.

In view of the above, it is readily apparent that the present invention provides an improved pressure compensated hydraulic system having improved response time in certain operating conditions. More specifically, in situations where no load generated pressure is present in the hydraulic jack being actuated, pressurized fluid from the supply conduit is communicated through the pilot passage and the control passage to the inlet port of the directional control valve connected to the jack. The fluid pressure in the jack increases immediately due to the load acting on the jack. The resulting load pressure is communicated through the load signal network to the spring end of the unloading valve where it cooperates with the spring to move the unloading valve to the closed position. This causes an immediate increase in the fluid flow and pressure in the supply conduit such that the flow control valve moves to a position for passing fluid therethrough to the dump valve where it becomes available for use by the directional control valve. Thereafter, the system operates in the usual manner with the restriction limiting fluid flow through the control passage. In situations where the jack tends to cavitate when a load is being lowered, the fluid in the control passage is fed into the cavitated end of the hydraulic jack. With the restriction limiting the flow therethrough, the pressure at the other end of the unloading valve is decreased sufficiently to allow the spring to urge the unloading valve to the closed position. This also causes an immediate increase in the system pressure sufficient to move the upstream flow control valve to a position to pass fluid from the supply conduit to the downstream directional control valve such that essentially full pump flow becomes available to fill the cavitated end of the jack.

Other aspects, objects, and advantages of this invention can be obtained from a study of the drawings, the disclosure, and the appended claims.

I claim:

1. A hydraulic control system comprising:

a pump;

supply conduit means connected to the pump;

an unloading valve connected to the supply conduit means and being movable between open and closed positions, said valve having first and second ends and a spring disposed at the first end and biasing the valve to the closed position;
- a directional control valve having an inlet port;
- means for connecting the supply conduit means to the inlet port;
- a pilot passage connecting the supply conduit means with the second end of the unloading valve;
- an orifice disposed in the pilot passage; and
- a control passage connecting the connecting means with the pilot passage between the orifice and the second end of the unloading valve.

2. The hydraulic control system of claim 1 wherein the connecting means includes a service passage connected to the inlet port of the directional control valve, and a dump valve having an inlet port connected to the supply conduit means and an outlet port connected to the service passage.

3. The hydraulic control system of claim 2 wherein said connecting means further includes a supplemental supply conduit connected to the supply conduit means and to the inlet port of the dump valve, the control passage being connected to the supplemental supply conduit.

4. The hydraulic control system of claim 3 wherein the connecting means further includes a flow control valve connected to the supply conduit means and to the supplemental supply conduit.

5. The hydraulic control system of claim 4 including a hydraulic tank and a return conduit connected to the hydraulic tank and to the unloading valve, said dump valve having a second outlet port connected to the return conduit.

6. The hydraulic control system of claim 5 wherein the dump valve is movable between a first position at which the the supplemental supply conduit communicates with the service passage and is blocked from the return conduit and a second position at which the supplemental supply conduit communicates with the return conduit, the dump valve including a spring biasing it to the first position.

7. The hydraulic control system of claim 5 including another directional control valve having an inlet port and a pair of outlet ports with one of the outlet ports being connected to the return conduit and the other outlet port being connected to the supplemental supply conduit, said inlet port being connected to the flow control valve.

8. The hydraulic control system of claim 7 including a hydraulic jack and first and second motor conduits connecting the opposite ends of the hydraulic jack to the other directional control valve, the other directional control valve being movable between a first position at which the inlet port thereof communicates with the second motor conduit and the first motor conduit communicates with the return conduit and a second position at which the first inlet port communicates with the motor conduit and the second motor conduit communicates with the supplemental supply conduit.

9. A hydraulic control system comprising:
- a pump;
- supply conduit means connected to the pump;
- an unloading valve connected to the supply conduit means and being movable between open and closed positions, said unloading valve having first and second ends and a spring positioned at the first end and biasing the unloading valve to the closed position;
- a pilot passage connected to the supply conduit means and to the second end of the unloading valve;
- a restriction disposed in the pilot passage;
- a first directional control valve having an inlet port connected to the supply conduit means and a pair of outlet ports;
- a supplemental supply conduit connected to one of the outlet ports of the first directional control valve;
- a dump valve having an inlet port and an outlet port, said inlet port being connected to the supplemental supply conduit;
- a second directional control valve having an inlet port connected to the outlet port of the dump valve; and
- a control passage connected to the supplemental supply conduit and to the pilot passage between the restriction and the second end of the unloading valve.

10. The hydraulic control system of claim 9 including a hydraulic tank and a return conduit connected to the hydraulic tank and to the unloading valve, said dump valve having a second outlet port connected to the return conduit.

11. The hydraulic control system of claim 10 including a flow control valve connected to the supply conduit means, the inlet port of the first directional control valve and the supplemental supply conduit.

* * * * *